United States Patent [19]
Kato

[11] Patent Number: 5,841,042
[45] Date of Patent: Nov. 24, 1998

[54] BRAKE LINING MATERIAL FOR HEAVY-LOAD BRAKING DEVICE

[75] Inventor: Yoshinari Kato, Mizunami, Japan

[73] Assignee: Tokyo Yogyo Kabushiki Kaisha, Tokyo, Japan

[21] Appl. No.: 639,688

[22] Filed: Apr. 29, 1996

[30] Foreign Application Priority Data

Oct. 20, 1995 [JP] Japan .................................... 7-295971
Oct. 20, 1995 [JP] Japan .................................... 7-295972
Oct. 20, 1995 [JP] Japan .................................... 7-295973

[51] Int. Cl.$^6$ ............................... B23F 3/12; C22C 1/05; C22C 9/00
[52] U.S. Cl. ................................ 75/231; 75/232; 75/235; 75/247
[58] Field of Search .................... 428/552, 566; 75/231, 232, 235, 247

[56] References Cited

U.S. PATENT DOCUMENTS

| | | | |
|---|---|---|---|
| 3,767,386 | 10/1973 | Ueda et al. ............................ | 75/123 D |
| 3,835,118 | 9/1974 | Rhee et al. ................................ | 260/38 |
| 3,844,800 | 10/1974 | Hooton ..................................... | 106/36 |
| 3,972,394 | 8/1976 | Jacko et al. ............................. | 188/73.1 |
| 4,833,040 | 5/1989 | Fishman et al. ......................... | 428/570 |
| 5,339,931 | 8/1994 | Jacko et al. . | |
| 5,626,692 | 5/1997 | Rohatgi et al. ......................... | 148/538 |

*Primary Examiner*—Daniel J. Jenkins
*Attorney, Agent, or Firm*—Carol I. Bordas

[57] ABSTRACT

The present invention is related to a brake lining material for a heavy-load braking device. The present invention is to provide a novel brake lining material which can have extended useful life under heavy-load conditions, can retain stable coefficients of friction under such heavy load conditions, can have appropriate wear resistance and can reduce the wear of its opponent material significantly. In accordance with the present invention, the novel brake lining material is provided which comprises copper-base metal powder, refractory material powder and graphite powder, the metal powder containing iron powder and titanium powder and being used as a matrix, the refractory material powder and the graphite powder being sintered together with this matrix in a uniformly distributed state in the powder. For example, a brake lining material for a heavy-load braking device is provided, which comprises, on a base of its total weight, 10 to 20 % refractory material powder, 15 to 25 % graphite powder and, as the remainder, copper-base metal powder, in which the refractory material powder are sintered together with the copper-base metal powder in a uniformly distributed state in the powder.

6 Claims, 2 Drawing Sheets

BRAKE LINING MATERIAL FOR HEAVY-LOAD BRAKING DEVICE

FIELD OF INVENTION

The present invention relates to a brake lining material for a heavy-load braking device.

BACKGROUND AND DESCRIPTION OF THE RELATED ART

An organic lining material or a metallic lining material is conventionally used as a brake lining material for a heavy-load braking device.

This organic lining material is produced from friction materials bound together by a resin binder. For example, inorganic fiber (e.g., asbestos fiber et al.), organic fiber, metallic fiber, inorganic substance (e.g., calcium carbonate et al.) powder, the powder, wires or chips of metals (e.g., Cu, Zn, Pb et al.) and the like are mixed and are bound together through the use of a binder such as phenolic resin or the like.

The metallic lining material described above is produced from friction materials or lubrication materials bound together by a sintered alloy metal. In an example of this lining material, 10 wt % or less of graphite powder and several wt % of silica powder are used as lubrication materials. These lubrication materials are mixed with a copper-base metal powder which contains about 10 wt % of iron powder and are bound together by sintering the metal powder.

These days, because the operating speed of a heavy-load crane motor, a heavy-load conveyor motor or a tilting motor for a heavyweight machine (e.g., a converter, an electric furnace or the like) is increasing and their working conditions are becoming more and more rigorous, the requirements for the brake lining materials used in such motors have become very strict.

The brake lining material is brought into contact with the sliding surface of the opponent material under a load acting on the lining material. This brake lining material must endure its repetitive use of thousands of times.

Thus, it is required that a brake lining material for a heavy-load braking device endures the repetitive and intense action of friction forces. In addition to this, this brake lining material must not damage the sliding surface of its opponent material and the grinding action to the opponent material must be suppressed as much as possible. Furthermore, it is necessary that the friction coefficient of the brake lining material does not vary so widely with the increase of its working temperature due to its repetitive use and with the variation of the loads acting on it. It is also required that this coefficient is stable at high temperatures.

With regard to the endurance of a brake lining material, the material must have suitable heat resistance as well as appropriate mechanical strength and wear resistance. For example, a crane must have a large braking force because its own weight is heavy and it deals with massive articles. Thus, a brake lining material for a heavy-load braking device used for such a crane must have a high level of mechanical strength and wear resistance as well as excellent heat resistance and stable coefficients of friction.

Although a conventional organic lining material for such a heavy-load braking device which is bound by a phenolic resin binder is not so costly, its mechanical strength is relatively low and it wears away steeply under heavy load conditions, which causes the abrupt decrease of its coefficient of friction. Particularly, when the temperature of the lining material reaches 300° C. or higher due to frictional heat, the phenolic resin binder carbonizes or decomposes and, because of this, the coefficient of friction of the lining material decreases rapidly and its wear resistance deteriorates substantially.

As for a conventional metallic lining material, when this lining material is put under a heavy load condition, its temperature can rise steeply and may seize up with an opponent material to be braked. As a result of this, both the metallic lining material and the opponent material may wear away severely under such a heavy-load condition.

Thus, a conventional brake lining material needs to be replaced frequently because the usable period during which its coefficient of friction remains stable is limited.

In order to solve the problems mentioned above, the object of the present invention is to provide a novel brake lining material which has extended usable life under heavy-load conditions, retains stable coefficients of friction under such heavy load conditions, has appropriate wear resistance and reduces the wear of its opponent material significantly.

SUMMARY OF INVENTION

In accordance with the present invention, a novel brake lining material for a heavy load braking device is provided which comprises a copper-base metal powder (or a copper-alloy-base metal powder), the metal powder containing iron powder and titanium powder as a matrix, the refractory material powder and the graphite powder being sintered together with this matrix in a uniformly distributed state in the metal powder.

According to a first embodiment of the present invention, a brake lining material for a heavy-load braking device is provided, which comprises on a base of its total weight, 10 to 20 wt % refractory material powder, 15 to 25 wt % graphite powder and, as the remainder, copper-base metal powder (or copper-alloy-base metal powder), in which the refractory material powder and the graphite powder are sintered together with the copper-base metal powder (or copper-alloy-base metal powder) in a uniformly distributed state in the metal powder.

According to a second embodiment of the present invention, a brake lining material for a heavy-load braking device is provided, in which, in the brake lining material according to the first embodiment of the present invention, the metal powder comprises powders of copper, a copper alloy, iron and titanium, the total weight ratio of the iron powder and the titanium powder being 0.2 to 0.4 on a base of the weight of the whole metal powder, and the remainder of the metal powder comprising copper powder, copper alloy powder or a mixture of them.

According to a third embodiment of the present invention, a brake lining material for a heavy-load braking device is provided, in which, in the brake lining material according to the second embodiment of the present invention, the weight ratio of the titanium powder is 0.1 to 0.5 on a base of the total weight of the iron powder and the titanium powder.

According to a fourth embodiment of the present invention, a brake lining material for a heavy-load braking device is provided, in which, in the brake lining material according to the first to third embodiment of the present invention, the refractory material powder is silica powder.

A brake lining material for a heavy-load braking device according to the present invention is particularly effective as a brake lining material for a heavy-load braking device used for braking a heavy-load crane motor, a heavy-load conveyor motor or a tilting motor for a heavyweight machine (e.g., a converter, an electric furnace or the like).

DETAILED DESCRIPTION OF THE INVENTION

Figure 1:
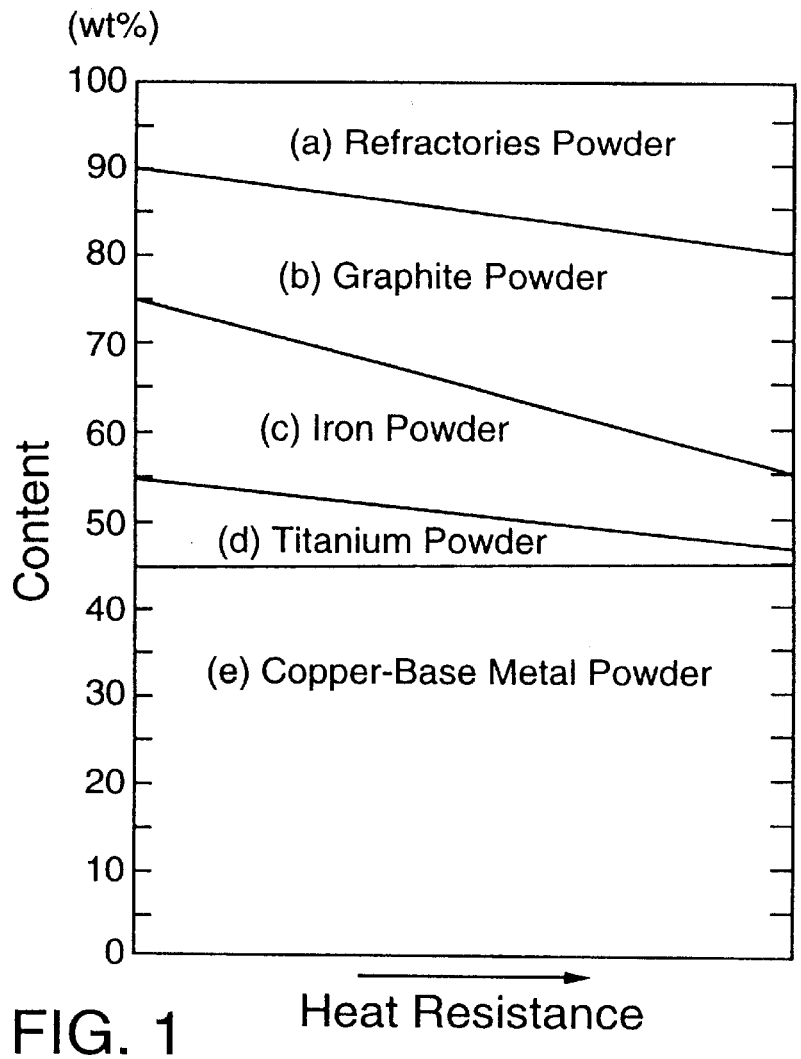
FIG. 1 shows the composition of a brake lining material for a heavy-load braking device according to the present invention.

Hereinafter, the term "a brake lining material for a heavy-load braking device" specifically means a brake lining material used for braking a heavy-load crane motor, a heavy-load conveyor motor or a tilting motor for a heavy-weight machine (e.g., a converter, an electric furnace or the like).

The major part of a brake lining material according to the present invention is a copper-base or copper-alloy-base metal powder (copper and copper alloy is generically referred as a copper-base metal hereinafter). This metal powder is used as a matrix and is sintered together with refractory material powder and graphite powder distributed uniformly in this matrix.

A metal powder matrix has mechanical strength far superior to that of phenolic resin. It also has excellent wear resistance and notable heat resistance. Its mechanical strength shows almost no variation within the temperature range from room temperature to hundreds of degrees °C.

Furthermore, the copper-base metal can suitably follow and fit the surface shape of an opponent material which provides an intense friction force to realize a high braking effect.

Examples of the copper-base metal which can be used for a brake lining material according to the present invention includes pure copper and copper alloys such as bronze (Cu-Sn), brass (Cu-Zn), a nickel and copper alloy (Cu-Ni), nickel silver (Cu-Ni-Zn) and the like. Among them, a nickel and copper alloy and nickel silver are costly and bronze and brass are considered to be practical.

Since a refractory material is generally harder than metals, the coefficient of friction of a lining material becomes larger when a refractory material is mixed in the lining material. In addition to this, a refractory material can retain its chemical and physical stabilities even at high temperatures higher than 1000° C. Thus, by mixing refractory material powder into the metal matrix it becomes possible to prevent the wearing of a lining material and the decrease of its coefficient of friction under a heavy load condition and to retain its coefficient of friction at a constant level even at elevated temperatures.

According to our study of the relationship between the coefficients of friction of a lining material and the content of refractory material powder in it, the increase of the coefficient of friction is responsive to the increase of the content of the refractory material powder. The coefficient of friction increases steeply until the content of the refractory material powder reaches about 10 wt % on a base of the total weight of a lining material and then the coefficient increases gradually with the increase of this content. Therefore, in terms of the coefficient of friction, the content of the refractory material powder is required to be 10 wt % or more. However, since the wear of an opponent material to be braked increases with the content increase of the refractory material powder, it is necessary to limit the content to 20 wt % or less.

Graphite has chemical stability higher than that of a refractory material and is poor in reactivity. During braking operation, a lining material and its opponent material are extremely susceptible to seizure, and graphite powder can prevent the seizure between a lining material and its opponent material and avoid their damage from the seizure. Furthermore, graphite powder can prevent the temperature-dependent variation of the coefficient of friction of a lining material and can retain this coefficient to a constant level.

Graphite content which produces a noticeable anti-seizure effect depends on the load acting on a lining material. For a lining material for a heavy-load braking device, graphite content of at least 15 wt % is necessary on a base of the total weight of the lining material. However, since the lubricating effect of graphite powder reduces the coefficient of friction of the lining material, it is necessary to avoid containing excessive graphite powder and to limit graphite content to 25 wt % or less. Examples of the graphite which can be used according to the present invention includes artificial graphite and scaly graphite. The average particle size of artificial graphite is preferably 500 to 2000 $\mu$m and that of scaly graphite is preferably 50 to 1000 $\mu$m.

Cast iron is generally used for an opponent material to be braked and has a hardness higher than that of copper-base metal. When matrix-forming metal powder contains additional metal powder which has a higher hardness and mechanical strength than those of the copper-base metal powder, a lining material which includes such matrix-forming metal powder provides even higher endurance in comparison with a corresponding lining material which comprises only copper-base metal powder. Examples of such additional metal powder includes iron powder, titanium powder and the like. When the content of such additional metal powder is about 20 wt % on a base of the overall weight of the matrix-forming metal powder used for a lining material, the wear quantity of a lining material decreases remarkably even under a high load condition.

However, when the total content of iron powder and titanium powder is excessive, this may weaken the binding power of a matrix. Thus, it is appropriate that the total content of iron powder and titanium powder is 0.4 wt % or less on the basis of the total weight of the overall metal powder used for a lining material and that the ratio of the total content of iron powder and titanium powder to the content of copper-base metal in the overall metal powder is 0.6 or more.

Comparing titanium with iron, titanium has higher hardness than that of iron and titanium powder can readily be mixed with copper-base metal powder. Thus, titanium powder has a significant reinforcement effect on the matrix of metal powder. Therefore, it is important that the matrix contains as much titanium powder as possible. However, excessive content of titanium powder results in extreme hardness of the matrix. This will make both refractory powder and graphite powder susceptible to fall-off from a lining material. Furthermore, titanium is a costly metal.

Thus, it is preferable that the weight ratio of titanium powder to iron powder is 0.1 to 0.5. From the viewpoint of sintering characteristics, it is also preferable that the average particle sizes of copper-base metal powder, iron powder, titanium powder and the like are 50 to 100 µm.

FIG. 1 shows the content range of each component of a brake lining material according to the present invention and each of the contents is presented on the basis of the total weight of the overall lining material. The length of the ordinate of this figure represents the content ranges. The range (a) is the content range of refractory material powder and extends from 10 wt % to 20 wt %. The range (b) is the content range of graphite powder and extends from 15 wt % to 25 wt %. The range (c) is the content range of iron powder and extends from about 8.7 wt % to 20 wt %. The range (d) is the content range of titanium powder and extends from about 1.7 wt % to 10 wt %. The range (e) is the content range of copper-base metal powder. The total of the ranges (c), (d) and (e) is the overall content of the metal powder (that is, the overall content of iron powder, titanium powder and copper-base metal powder) and extends from 55 wt % to 75 wt %.

In FIG. 1, since the content of refractory material powder and that of graphite powder increase with the transition of the composition of the lining material in the right direction of the abscissa of this graph, the heat resistance of the lining material increases with the transition of its composition in the same direction. In contrast to this, since the content of the iron powder and that of titanium powder decrease with the transition of the composition of the lining material in the right direction of the abscissa, the wear resistance of the lining material decreases with the transition of its composition in the same direction.

Figure 2:
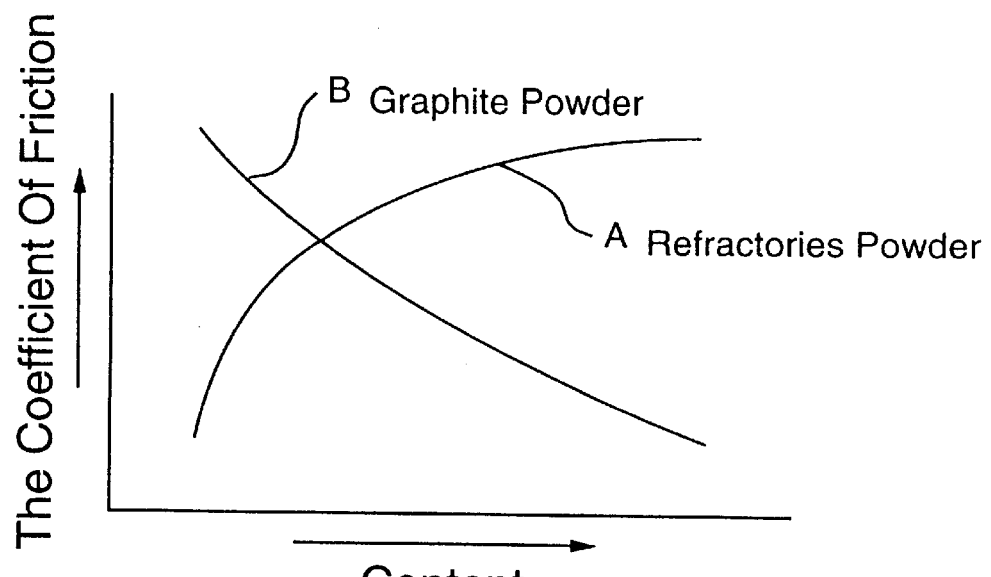
FIG. 2 shows the relationship among graphite powder content, refractory material powder content and the coefficients of friction of a brake lining material according to the present invention.

FIG. 2 shows the relationship among graphite powder content, refractory material powder content and the coefficients of friction of a brake lining material according to the present invention. In this figure, the curve A represents the variation of the content of the refractory material powder and the curve B represents the variation of the content of the graphite powder. As shown in this figure, the refractory material powder and the graphite powder have reverse effects to each other in terms of the coefficient of friction of the lining material.

Examples of the refractory material includes silica ($SiO_2$), Alumina ($Al_2O_3$), magnesia (MgO) and the like. Among them, silica can minimize the wear quantity of an opponent material to be braked. From the viewpoint of the coefficient of friction of the lining material, it is preferable that the particle size of the refractory material powder is about 100 to 1000 µm.

The brake lining material whose major part comprises copper-base metal as described hereinbefore has significant mechanical strength, high wear resistance and superior heat resistance and can retain a stable and constant coefficient of friction even at high temperatures. Thus, by using this lining material as a brake lining material for a heavy-load braking device, the useful life of the brake lining material can be remarkably increased. A brake lining material for a heavy-load braking device according to the present invention can be applied to a braking device for a heavy-load crane motor, a heavy-load conveyor motor (e.g., a motor for a belt conveyor) or a tilting motor for a heavyweight machine (e.g., a converter, an electric furnace or the like).

EXAMPLE 1

Iron powder and titanium powder were added to copper-base metal powder and then refractory material powder and graphite powder were added to this metal powder mixture. After the composition, thus obtained, was mixed well and molded into a plate form under a pressure of 2 t/cm$^2$, the molded composition was sintered in a vacuum, at 900° C. for 60 minutes, under a pressure of 5 kg/cm$^2$. Thus, a brake lining material for a crane motor was obtained.

Figure 4:
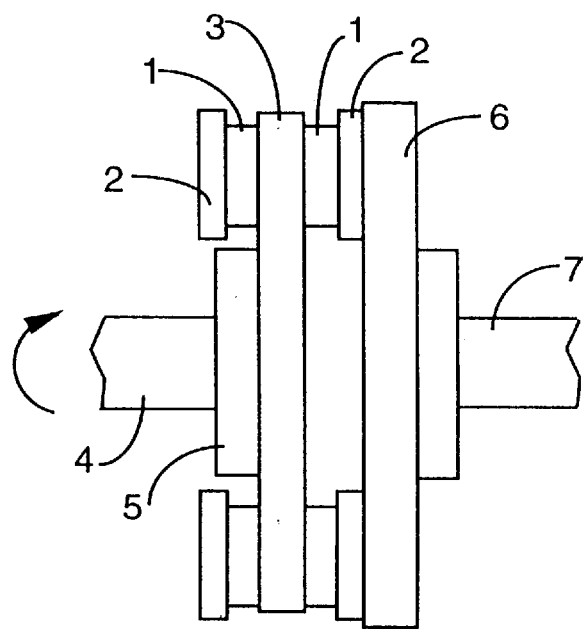
FIG. 4 is a schematic diagram of a mounting structure for mounting a test sample onto the testing device for testing the characteristics of a brake lining material.

As shown in FIG. 4, this lining material 1 was backed with a back plate 2 to form a brake plate and then used as a sample for testing. The coefficient of friction and the wear quantity of it and the wear quantity of its opponent material of a braking device were determined and the characteristics of the lining material 1 were evaluated.

Figure 3:
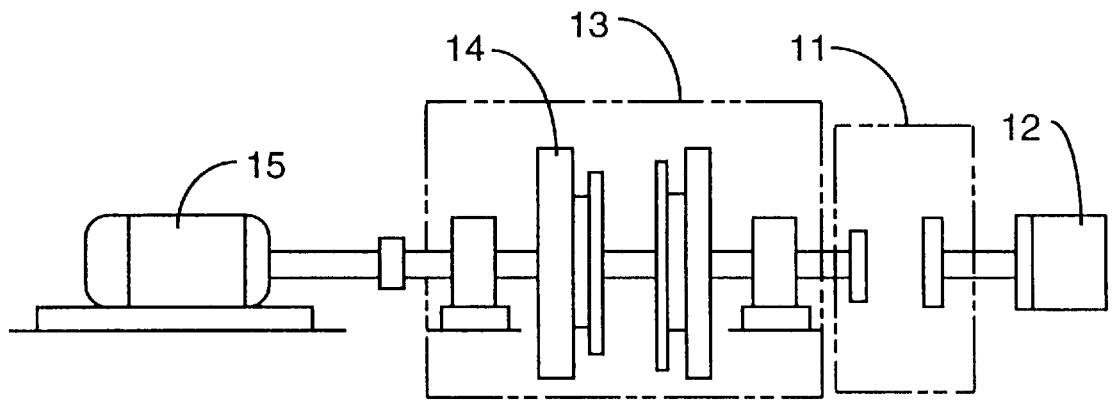
FIG. 3 is a schematic diagram of a general structure of a testing device for testing characteristics of a brake lining material.

FIG. 3 is a schematic diagram of a general structure of a testing device for testing characteristics of a brake lining material. A sample mounting section is indicated by the numeral 11, a torque detection section is indicated by the numeral 12, and an inertial-force control section is indicated by the numeral 13 where inertial force is controlled by means of the weight of a fly wheel 14. The numeral 15 indicates a motor.

FIG. 4 shows the details of the sample mounting section 11 presented in FIG. 3. As shown in this figure, a brake plate comprised a lining material 1 backed with a back plate 2. This brake plate was pressed against a brake disc 3. This brake disc 3 was rotated via a disc fixing plate 5 which was mounted on a rotation shaft 4. The brake plate was attached onto a brake actuating plate 6. The torque was detected through the shaft 7 of the brake actuating plate 6 in order to calculate the coefficients of friction of the lining material.

The tests for the rotation and braking characteristics of a lining material were performed under the following test condition;

| | |
|---|---|
| Opponent material | gray pig iron FC200 (JISG 5501), |
| Contact area | 36.5 cm$^2$, |
| Initial velocity of braking surface | 120 km/h, |
| Inertial force | 5.5 kg · m · sec$^2$, |
| Braking retardation | 0.5 G, |
| Number of repeat | 50 times |

The high temperature characteristics of the lining material samples were determined by elevating the atmospheric temperature of the sample mounting section to 300° C. The coefficients of friction of the lining material samples were measured at 300°C. and at 600° C. and the ratios of the coefficients of friction at 600° C. to those at 300° C. were calculated in order to determine the stability of the coefficients of friction of the lining material samples at high temperatures. A conventional phenolic resin mold material (containing asbestos fiber) and a conventional metallic lining material were tested through the same procedure and the test results were compared with those of the lining materials according to the present invention.

The compositions and test results of the lining material tested are listed in Table 1.

In the lining materials according to the present invention, their average coefficients of friction were about 0.5. The ratios of their average coefficients of friction at 600° C. to those at 300° C. were about 0.9 and these coefficients of friction did not vary so much even at 600° C. This indicated that the lining materials according to the present invention were stable in their coefficients of friction even at high temperatures.

Furthermore, in the lining materials according to the present invention, each of their self-wear quantities did not reach 100 μm and each of the wear quantities of their opponent materials was 100 μm or less. These results satisfied requirements.

In contrast to these results, for the comparable samples used, test No. 4 which used the lining material whose metal powder comprised only copper-base metal powder showed that the self-wear quantity of the lining powder was high. Test No. 5 which used the lining material containing no refractory material powder showed that the average coefficient of friction of this lining material was excessively low. Test No. 6 which used the lining material containing no graphite powder showed that its seizure occurred locally even at 300° C. and its average coefficient of friction and the wear of opponent material were excessively high. Furthermore, test No. 6 also showed that the several seizures occurred between the lining material and its opponent material and the average coefficient of friction of that lining material was extremely high at 600° C.

In addition to this, test No. 7 which used a conventional metallic lining material containing very little of iron powder, no titanium powder and no refractory material powder revealed that this material seized up locally even at 300° C. and that its average coefficient of friction was somewhat high and both the self-wear quantity of the lining material and the wear quantity of its opponent material were high. Its average coefficient of friction was even higher at 600° C.

Test No. 8, which used a conventional organic lining material showed that the average coefficient of friction of this lining material was excessively low and its self-wear quantity was extremely high. In this test, this organic lining material was so damaged at 600° C. that its measurement became impossible.

The experiment in which the lining materials according to the present invention of test No. 3 of Table 1 was used as a brake lining for a braking device of a 60-ton heavy-load crane motor showed that this lining material could provide a stable braking force and had a useful life of 3 months.

In contrast to this result, the experiment in which the conventional metallic lining material of Table 1 was used as the same brake lining revealed that the braking force of this material was unstable and its useful life was only 1.5 months.

EXAMPLE 2

In this Example, a brake lining for a sliding motor was made. The method for making the lining material samples used in tests and the procedure for testing these samples were the same as those of Example 1.

The compositions and the test results of the lining materials are listed in Table 2.

The test results showed that each of the lining materials according to the present invention had an average coefficient of friction of about 0.5 and the above-mentioned ratio of the average coefficients of friction was about 0.9. When each of these lining materials was heated to 600° C., its coefficient of friction displayed only slight variation and was stable at high temperatures. The self-wear quantity of each of the lining materials according to the present invention was lower than 100 μm and the wear quantity of each of their opponent materials was 10 μm or less. These results satisfied requirements.

In contrast to this, for the comparable samples used, test No. 4 which used the lining material whose metal powder comprised only copper-base metal powder showed that the self-wear quantity of this lining material was high. Test No. 5 which used the lining material containing no refractory material powder showed that the average coefficient of friction of this lining material was excessively low. Test No. 6 which used the lining material containing no graphite powder showed that the seizure occurred locally between the lining material and its opponent material even at 300° C. and its average coefficient of friction was high. Furthermore, Test No. 6 also showed that the wear quantity of the opponent material was high and, during this test, severe seizures occurred at 600° C. between the lining material and its opponent material. At this temperature, the average coefficient of friction of the lining material was extremely high.

Test No. 7 which used a conventional metallic lining material containing very little quantity of iron powder, no titanium powder and no refractory material powder revealed that this conventional material seized up locally even at 300° C. and that its average coefficient of friction was somewhat high and both the self-wear quantity of the lining material and the wear quantity of its opponent material were high. Its average coefficient of friction was even higher at 600° C.

Test No. 8, which used a conventional organic lining material showed that the average coefficient of friction of this material was excessively low and its self-wear quantity was extremely high. In this test, this material was so damaged at 600° C. that its measurement became impossible.

The experiment in which the lining material according to the present invention of No. 3 of Table 2 was used as a brake lining for a braking device of a sliding motor used for a 100-ton electric furnace showed that this lining material had stable braking force and had a useful life of 3 months.

In contrast to this result, the experiment in which the conventional metallic lining of Table 2 was used as the same brake lining revealed that the braking force of this material was unstable and its useful life was only 1.5 months.

EXAMPLE 3

In this Example, a brake lining for a belt conveyor motor was made. The method for making the lining material samples used in the tests and the procedure for testing these samples were the same as those of Example 1. The compositions and the test results of the lining materials are listed in Table 3.

A conventional phenolic resin mold material (containing asbestos fiber) and a conventional metallic lining material were also tested by the use of the same procedure as described above and their test results were compared with those of the lining materials according to the present invention.

The test results revealed that each of the lining materials according to the present invention had an average coefficient of friction of about 0.5 and the above-mentioned ratio of the average coefficients of friction was about 0.9. When each of these lining materials was heated to 600° C., its coefficient of friction displayed only slight variation and was stable at high temperatures.

The self-wear quantity of each of the lining materials according to the present invention was lower than 100 μm and the wear quantity of each of their opponent materials was 10 μm or less. These results satisfied requirements.

In contrast to this, for the comparable samples used, test No. 4 which used the lining material whose metal powder comprised only copper-base metal powder showed that the self-wear quantity of this metal powder was high. Test No.

5 which used the lining material containing no refractory material powder showed that the average coefficient of friction of this lining material was excessively low. Test No. 6, which used the lining material containing no graphite powder showed that its seizure occurred even at 300° C. and its average coefficient of friction was high. Furthermore, test No. 6 also showed that the wear quantity of the opponent material was high and, during this test, severe seizure occurred at 600° C. between the lining material and its opponent. At this temperature, the average coefficient of friction of the lining material was extremely high.

Test No. 7, which used a conventional metallic lining material containing very little quantities of iron powder, no titanium powder and no refractory material powder revealed that this material seized up locally even at 300°C. and that its average coefficient of friction was somewhat high and both of the self-wear quantity of the lining material and the wear quantity of its opponent material were high. Its average coefficient of friction was even higher at 600° C.

Test No. 8, which used a conventional organic lining material showed that the average coefficient of friction of this material was excessively low and its self-wear quantity was extremely high. In this test, the organic lining material was so damaged at 600° C. that its measurement became impossible.

The experiment in which the lining material according to the present invention of No. 3 of Table 3 was used as a brake lining for a braking device of a 40-ton conveyor motor displayed that this lining material had stable braking force and had useful life of 3 months.

In contrast to this result, the experiment in which the conventional metallic lining of Table 3 was used as the same brake lining revealed that the braking force of this material was unstable and its useful life was only 1.5 months.

As described hereinbefore, in a brake lining material according to the present invention, suitable kinds of metal powders, refractory material powder and graphite powder are sintered together in their appropriate proportions. Thus a brake lining material according to the present invention can provide a braking material for a heavy-load braking device which can exhibit stable braking force and extended useful life under various severe conditions.

TABLE 1

| | Article | | Examples of Invention | | | Comparable Samples | | | Conventional Samples | |
|---|---|---|---|---|---|---|---|---|---|---|
| | | Test No. | 1 | 2 | 3 | 4 | 5 | 6 | 7 | 8 |
| Metal Powder | Copper-base metal | Kind | Copper | Brass | Bronze | Brass | Bronze | Copper | Copper | Phenolic Resin, Asbestos Fiber |
| | | Content (wt %) | 43 | 45 | 45 | 65 | 60 | 65 | 90 | |
| | | Average Particle Size (μm) | 50 | 90 | 70 | 60 | 100 | 60 | 70 | |
| | Iron | Content (wt %) | 10 | 15 | 20 | — | 15 | 15 | 5 | |
| | | Average Particle Size (μm) | 50 | 90 | 70 | 60 | 100 | 60 | 70 | |
| | Titanium | Content (wt %) | 2 | 5 | 10 | — | 5 | 5 | — | |
| | | Average Particle Size (μm) | 50 | 90 | 70 | 60 | 100 | 60 | 70 | |
| Refractory Material | | Kind | Magnesia | Alumina | Silica | Magnesia | Alumina | Silica | — | Calcium Carbonate |
| | | Content (wt %) | 20 | 15 | 10 | 15 | — | 15 | — | |
| | | Average Particle Size (μm) | 200 | 800 | 400 | 700 | 300 | 800 | — | |
| Graphite | | Content (wt %) | 25 | 20 | 15 | 20 | 20 | — | 5 | — |
| | | Average Particle size (μm) | 700 | 500 | 1000 | 800 | 500 | 900 | 700 | — |
| Test Results | Average Coefficient of Friction | At 300° C. | 0.49 | 0.48 | 0.46 | 0.48 | 0.34 | 0.89 | 0.61 | 0.17 |
| | | 600° C./300° C. | 0.95 | 0.91 | 0.86 | 0.91 | 0.75 | 2.56 | 1.82 | Not Measurable |
| | Self-wear Quantity (μm) | | 94 | 70 | 55 | 150 | 70 | 170 | 125 | 397 |
| | Wear Quantity of an Opponent Material (μm) | | 10 | 9 | 8 | 9 | 2 | 105 | 38 | 6 |

TABLE 2

| | Article | | Examples of Invention | | | Comparable Samples | | | Conventional Samples | |
|---|---|---|---|---|---|---|---|---|---|---|
| | | Test No. | 1 | 2 | 3 | 4 | 5 | 6 | 7 | 8 |
| Metal Powder | Copper-base metal | Kind | Copper | Brass | Bronze | Brass | Bronze | Copper | Copper | Phenolic Resin, Asbestor Fiber |
| | | Content (wt %) | 42 | 45 | 45 | 65 | 60 | 65 | 90 | |
| | | Average Particle Size (μm) | 70 | 100 | 50 | 60 | 90 | 60 | 70 | |
| | Iron | Content (wt %) | 10 | 15 | 20 | — | 15 | 15 | 5 | |
| | | Average Particle Size (μm) | 90 | 50 | 70 | 100 | 60 | 80 | 70 | |
| | Titanium | Content (wt %) | 3 | 5 | 10 | — | 5 | 5 | — | |
| | | Average Particle Size (μm) | 50 | 90 | 70 | 60 | 100 | 60 | 70 | |
| Refractory Material | | Kind | Alumina | Magnesia | Silica | Silica | Alumina | Magnesia | — | Calcium Carbonate |
| | | Content (wt %) | 20 | 15 | 10 | 15 | — | 15 | — | |
| | | Average Particle Size (μm) | 200 | 800 | 400 | 700 | 300 | 800 | — | |
| Graphite | | Content (wt %) | 25 | 20 | 15 | 20 | 20 | — | 5 | — |
| | | Average Particle size (μm) | 700 | 500 | 1000 | 800 | 500 | 900 | 700 | — |
| Test Results | Average Coefficient of Friction | At 300° C. | 0.51 | 0.49 | 0.47 | 0.48 | 0.37 | 0.93 | 0.67 | 0.19 |
| | | 600° C./300° C. | 0.95 | 0.89 | 0.83 | 0.90 | 0.31 | 2.77 | 1.98 | Not Measurable |
| | Self-wear Quantity (μm) | | 101 | 83 | 66 | 182 | 82 | 195 | 147 | 495 |
| | Wear Quantity of an Opponent Material (μm) | | 12 | 11 | 10 | 11 | 5 | 112 | 4.3 | 8 |

TABLE 3

| Article | | | Examples of Invention | | | Comparable Samples | | | Conventional Samples | |
|---|---|---|---|---|---|---|---|---|---|---|
| | | Test No. | 1 | 2 | 3 | 4 | 5 | 6 | 7 | 8 |
| Metal Powder | Copper-base metal | Kind | Copper | Brass | Bronze | Brass | Bronze | Copper | Copper | Phenolic Resin, Asbestos Fiber |
| | | Content (wt %) | 44 | 45 | 45 | 65 | 60 | 65 | 90 | |
| | | Average Particle Size (μm) | 50 | 90 | 70 | 60 | 100 | 60 | 70 | |
| | Iron | Content (wt %) | 10 | 15 | 20 | — | 15 | 15 | 5 | |
| | | Average Particle Size (μm) | 50 | 90 | 70 | 60 | 100 | 60 | 70 | |
| | Titanium | Content (wt %) | 1 | 5 | 10 | — | 5 | 5 | — | |
| | | Average Particle Size (μm) | 50 | 90 | 70 | 60 | 100 | 60 | 70 | |
| Refractory Material | | Kind | Magnesia | Alumina | Silica | Magnesia | Alumina | Silica | — | Calcium Carbonate |
| | | Content (wt %) | 20 | 15 | 10 | 15 | — | 15 | — | |
| | | Average Particle Size (μm) | 200 | 800 | 400 | 700 | 300 | 800 | — | |
| Graphite | | Content (wt %) | 25 | 20 | 15 | 20 | 20 | — | 5 | — |
| | | Average Particle size (μm) | 700 | 500 | 1000 | 800 | 500 | 900 | 700 | — |
| Test Results | Average Coefficient of Friction | At 300° C. | 0.49 | 0.47 | 0.45 | 0.46 | 0.33 | 0.85 | 0.59 | 0.15 |
| | | 600° C./300° C. | 0.95 | 0.93 | 0.87 | 0.94 | 0.78 | 2.34 | 1.68 | Not Measurable |
| | Self-wear Quantity (μm) | | 91 | 65 | 51 | 138 | 66 | 156 | 118 | 371 |
| | Wear Quantity of an Opponent Material (μm) | | 9 | 8 | 7 | 8 | 2 | 101 | 35 | 5 |

I claim:

1. A brake lining material, comprising, on a base of its total weight, (a) 10 to 20 wt % of refractory material powder;

(b) 15 to 25 wt % a graphite powder, and (c) as its remainder, a copper-based metal powder comprising powders of copper-based metal, iron and titanium wherein a total weight of said iron powder and said titanium powder is 0.2 to 0.4 on a base of a total weight of said metal powder and a remainder of said metal powder comprising copper-base metal which consists of copper powder, copper alloy powder or a mixture of said copper powder and said copper alloy powder and in which said refractory material powder and said graphite powder are sintered together with said metal powder in a uniformly distributed state in said metal powder.

2. The brake lining material as defined in claim 1 wherein a weight ratio of said titanium powder is 0.1 to 0.5 on a base of the total weight of said iron powder and said titanium powder.

3. A brake lining material as defined in claim 2 wherein said refractory material powder is silica.

4. A brake lining material for a crane motor, a sliding motor or a conveyor motor which comprises, on a base of its total weight, (a) 10 to 20 wt % of refractory material powder;

(b) 15 to 25 wt % a graphite powder, and (c) as its remainder, a copper-based metal powder comprising powders of copper-based metal, iron and titanium wherein a total weight of said iron powder and said titanium powder is 0.2 to 0.4 on a base of a total weight of said metal powder and a remainder of said metal powder comprising copper-base metal which consists of copper powder, copper alloy powder or a mixture of said copper powder and said copper alloy powder and in which said refractory material powder and said graphite powder are sintered together with said metal powder in a uniformly distributed state in said metal powder.

5. The brake lining material as defined in claim 4, wherein a weight ratio of said titanium powder is 0.1 to 0.5 on a base of the total weight of said iron powder and said titanium powder.

6. The brake lining material as defined in claim 5, wherein said refractory material powder is silica.

* * * * *